United States Patent [19]
Katoh et al.

[11] Patent Number: 5,418,808
[45] Date of Patent: May 23, 1995

[54] SOLID STATE LASER

[75] Inventors: Takayuki Katoh; Syozo Takeuchi; Takashi Nakamura, all of Kanagawa, Japan

[73] Assignee: Fuji Photo Film Co., Ltd., Kanagawa, Japan

[21] Appl. No.: 149,541

[22] Filed: Nov. 5, 1993

[30] Foreign Application Priority Data

Nov. 6, 1992 [JP] Japan .................................. 4-297008

[51] Int. Cl.$^6$ .............................................. H01S 3/16
[52] U.S. Cl. ................................................... 372/41
[58] Field of Search ......................................... 372/41

[56] References Cited

U.S. PATENT DOCUMENTS 5,124,999 6/1992 Okazaki et al. .

FOREIGN PATENT DOCUMENTS 62-189783 8/1987 Japan .

OTHER PUBLICATIONS

"Laser Research" vol. 18, No. 8, (1990), pp. 94–99, by T. Kojima et al.
"Laser/Atomic Oscillator and Ultimate Light Quantum Engineering" Symposium, E-2 (1990), pp. 56–57 by T. Kojima et al.

Primary Examiner—Léon Scott, Jr.
Attorney, Agent, or Firm—Sughrue, Mion, Zinn, Macpeak & Seas

[57] ABSTRACT

A solid state laser which has $Y_xGd_{1-x}VO_4$ doped with Nd wherein $0 \leq X \leq 0.5$ as a solid laser medium.

10 Claims, 4 Drawing Sheets

SOLID STATE LASER

BACKGROUND OF THE INVENTION

1. Field of the Invention

This invention relates to a solid state laser, and more particularly to a solid state laser which utilizes a novel laser medium.

2. Description of the Prior Art

As disclosed, for instance, in Japanese Unexamined Patent Publication No. 62(1987)-189783, there has been known a laser diode pumped solid state laser where a solid state laser medium doped with a rare earth element such as Nd is pumped with a semiconductor laser. As the solid state laser medium, a crystal of $YVO_4$, YAG-($Y_3Al_5O_{12}$) or the like doped with Nd has been widely used. In some of the laser diode pumped solid state lasers of this type, a bulk single crystal of nonlinear optical material which converts the wavelength of the solid state laser oscillation beam is provided in the resonator and the solid state laser oscillation beam is converted into second harmonic wave or the like in order to obtain a laser beam of a shorter wavelength. See U.S. Pat. No. 5,124,999, "Laser Research" vol. 18, No. 8, (1990), pp. 94 to 99 and the like.

For example, in "Laser Research" vol. 18, No. 8, (1990), page 646, there is reported an experiment where a 12.8 mW second harmonic output of substantially single longitudinal mode was obtained for a 760 mW semiconductor laser input power by converting a beam oscillated by $Nd:YVO_4$ (Nd ion concentration of 1.1 at %) into second harmonics with a KTP crystal disposed in the resonator. In another report in the abstracts for "Laser/Atomic Oscillator and Ultimate Light Quantum Engineering" Symposium (promoted by Applied Physical Society and Quantum Electronics Society) E-2, (1990), p. 56, there is reported an experiment where a 9.1 mW second harmonic output of single longitudinal mode was obtained for a 740 mW semiconductor laser input power by use of $Nd:YVO_4$ (Nd ion concentration of 2.02 at %) and a 7.0 mm thick KTP crystal.

The conventional solid state lasers are disadvantageous in that the Nd ion concentration can be increased only about 2 at % at most and accordingly absorption of the pumping laser power is small. When absorption of the pumping laser power is small, a multimode oscillation occurs due to a space hole burning effect, whereby output of the solid state laser becomes unstable.

Further in the conventional solid state lasers, since the absorption spectrum width for the pumping laser is narrow, there has been a problem that the output of the laser is apt to fluctuate with fluctuation of the wavelength of the pumping source such as a laser diode.

SUMMARY OF THE INVENTION

In view of the foregoing observations and description, the primary object of the present invention is to provide a solid state laser which has a large absorption coefficient at the pumping laser wavelength and a wide absorption band width and accordingly has a stable output.

The solid state laser in accordance with the present invention is characterized by having a novel laser medium. That is, in one aspect of the present invention, there is provided a solid state laser comprising $Y_xGd_{1-x}VO_4$ doped with Nd wherein $0 \leq x \leq 0.5$ as a solid laser medium. In another aspect of the present invention, there is provided a solid state laser comprising $La_xGd_{1-x}VO_4$ doped with Nd wherein $0 \leq x \leq 0.1$ as a solid laser medium.

The reason why the Nd ion concentration cannot be increased in the conventional solid state laser medium is that the difference between the ion radius of Nd and the ion radius of the atom which is to be substituted for Nd (for example, Y in the case of a Nd:YAG laser) is too large. That is, the ion radius of Nd is 1.15Å whereas the ion radius of Y is 1.06Å. On the other hand, the ion radius of Gd which is employed in the present invention is 1.11Å and approximates to that of Nd. Accordingly, in $Nd:Y_xGd_{1-x}VO_4$ laser medium or $Nd:La_xGd_{1-x}VO_4$ laser medium including therein Gd, the Nd ion concentration can be sufficiently high.

Crystals of $Nd:GdVO_4$ ($x=0$ in $Nd:Y_xGd_{1-x}VO_4$) were grown with the Nd ion concentration changed in the range of 0.2 to 10 at %. All the crystals grown were excellent single crystals.

When the solid laser medium has a sufficiently high Nd ion concentration, absorption of the pumping laser power is improved and the output of the solid state laser can oscillate in single longitudinal mode, whereby the output of the solid state laser can be stable.

The absorption of a $Nd:GdVO_4$ crystal having a Nd ion concentration of 1 at % were investigated. The absorption coefficient $\alpha$ for a 808 nm pumping laser beam was 9.2 cm$^{-1}$ and was sufficiently high as compared with the absorption coefficient $\alpha$ (6.0 cm$^{-1}$) of Nd:YAG having the same Nd ion concentration. Further the absorption coefficient $\alpha$ was 46 cm$^{-1}$ in the case of $Nd:GdVO_4$ crystal having a Nd ion concentration of 5 at %.

As for the absorption spectrum band to the pumping laser, the half-width at an absorption peak near 800 nm of the conventional laser medium, e.g., Nd:YAG, is about 2 nm whereas that of the $Nd:GdVO_4$ having a Nd ion concentration of 5 at % is 5 nm and is sufficiently wide. The result of measurement of the absorption spectra is shown in FIG. 3. When the absorption spectrum width to the pumping laser power is wide, stable output can be obtained even if the wavelength of the pumping laser fluctuates to some extent.

FIG. 4 shows the fluorescent spectra of $Nd:GdVO_4$ having a Nd ion concentration of 3 at %. In FIG. 4, the portion of the line indicated at a is due to $^4F_{3/2} \rightarrow {}^4I_{9/2}$ transition, the portion of the line indicated at b is due to $^4F_{3/2} \rightarrow {}^4I_{11/2}$ transition, and the portion of the line indicated at c is due to $^4F_{3/2} \rightarrow {}^4I_{13/2}$ transition.

In order to investigate $\sigma\tau$ product which is inversely proportional to the laser threshold, the stimulated emission cross section of $Nd:GdVO_4$ was measured. It was about $2 \times 10^{-18}$ cm$^2$. The relation between the Nd ion concentration and the fluorescent lifetime was shown in FIG. 5. These results show that when the Nd ion concentration is not higher than 3 at %, $Nd:GdVO_4$ has a $\sigma\tau$ product larger than that of Nd:YAG (Nd$\simeq$1 at %) and accordingly, the laser threshold is lower than that of Nd:YAG.

DESCRIPTION OF THE PREFERRED EMBODIMENTS

Figure 1:
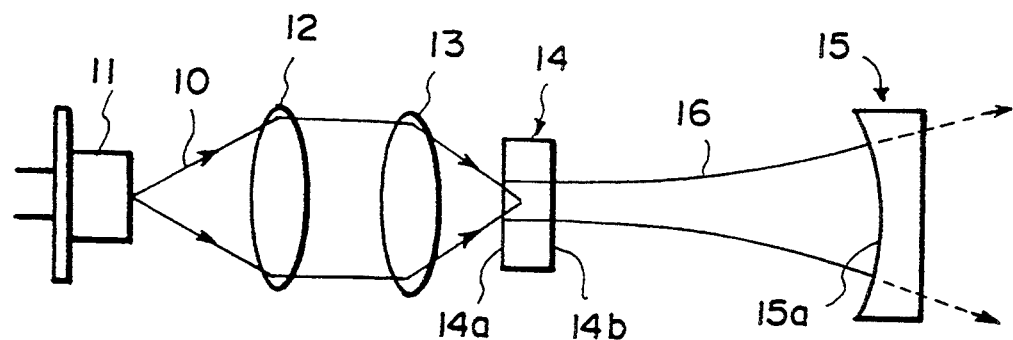
FIG. 1 is a schematic side view of a solid state laser in accordance with a first embodiment of the present invention.

In FIG. 1, a laser diode pumped solid state laser in accordance with a first embodiment of the present invention comprises a laser diode 11 which emits a pumping laser beam 10, a collimator lens 12 which collimates the laser beam 10 which is emitted in the form of a divergent light ray, a focusing lens 13 which focuses the collimated laser beam 10, a Nd:GdVO$_4$ crystal 14 whose Nd ion concentration is 3 at %, and a resonator mirror 15 disposed in front of (right side as seen in FIG. 1) the Nd:GdVO$_4$ crystal 14.

The fluorescence of 1063 nm which is due to $^4F_{3/2} \rightarrow {}^4I_{11/2}$ transition is emitted from Nd:GdVO$_4$ crystal when Nd atoms are stimulated by the laser beam 10 of 808 nm and laser oscillation thereof was obtained. A 1063 nm laser beam 16 is obtained through the resonator mirror 15.

In this embodiment, the light incident side face 14a of the Nd:GdVO$_4$ crystal 14 and the resonator mirror 15 form a resonator of the solid state laser. The coating properties for wavelengths of 808 nm and 1063 nm of the light incident side face 14a and the other face 14b of the Nd:GdVO$_4$ crystal 14 and the mirror surface 15a of the resonator mirror 15 are as shown in the following table. In the table, AR indicates anti-reflection and HR indicates high reflection.

|  | 808 nm | 1063 nm |
| --- | --- | --- |
| face 14a | AR | HR |
| face 14b | — | AR |
| mirror surface 15a | — | HR |

The laser beam 16 output from the resonator mirror 15 proved to be very stable. The reason is as described above.

Figure 2:
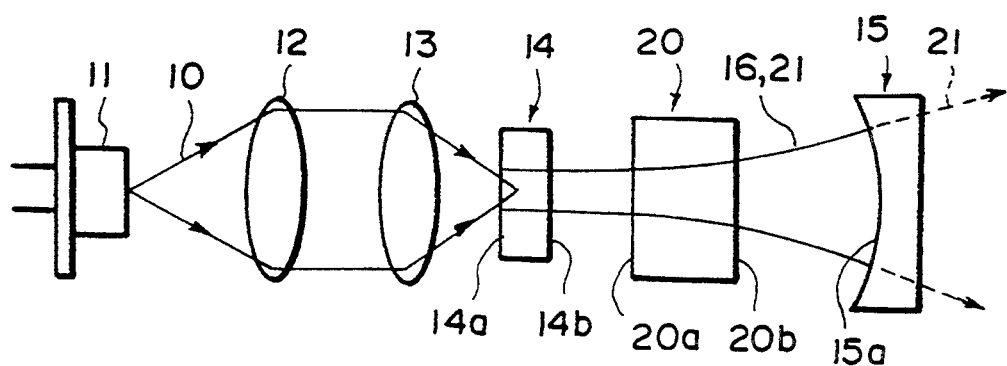
FIG. 2 is a schematic side view of a solid state laser in accordance with a second embodiment of the present invention.
Figure 3:
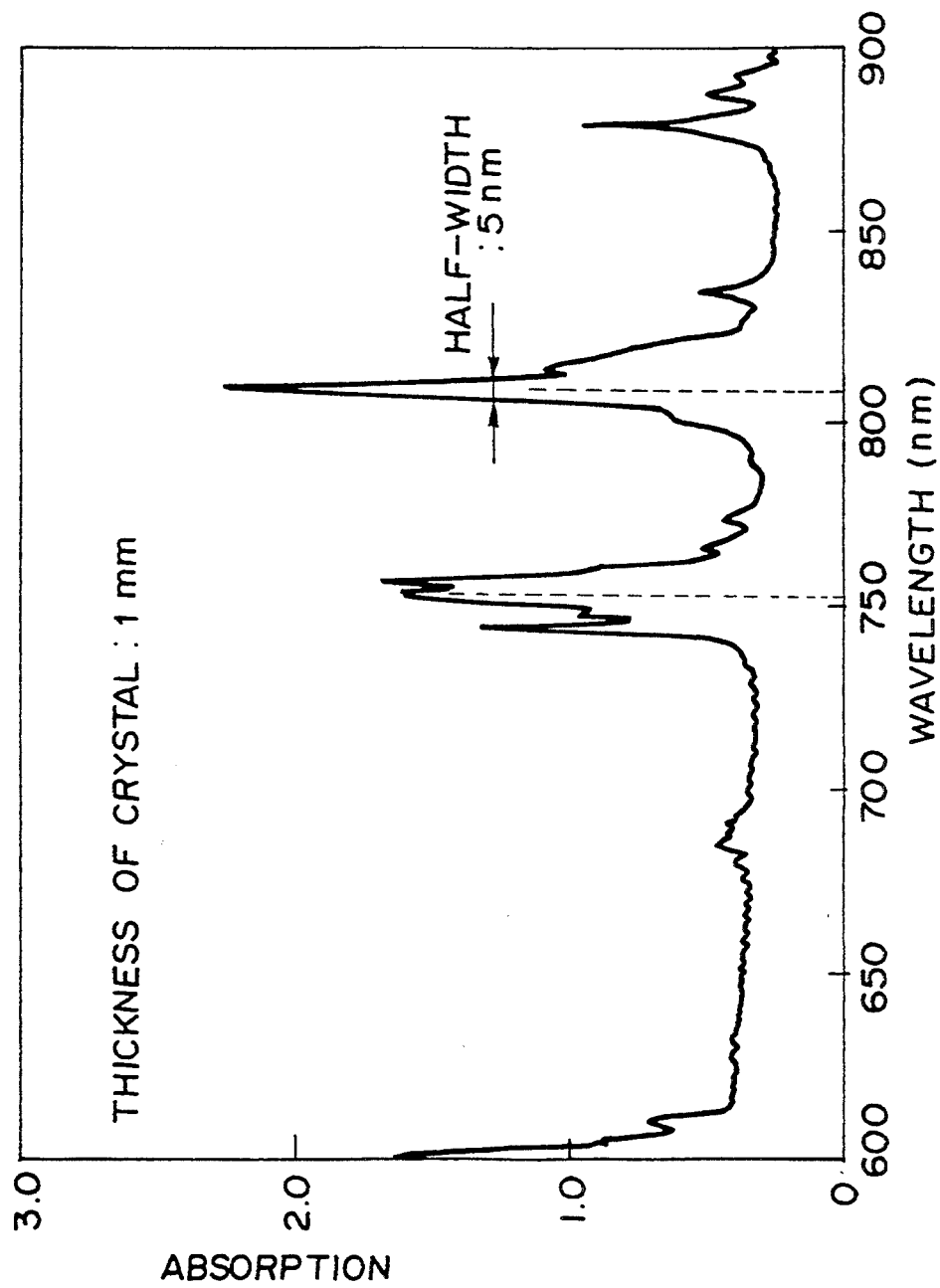
FIG. 3 is a graph showing the absorption spectra of Nd:GdVO$_4$.
Figure 4:
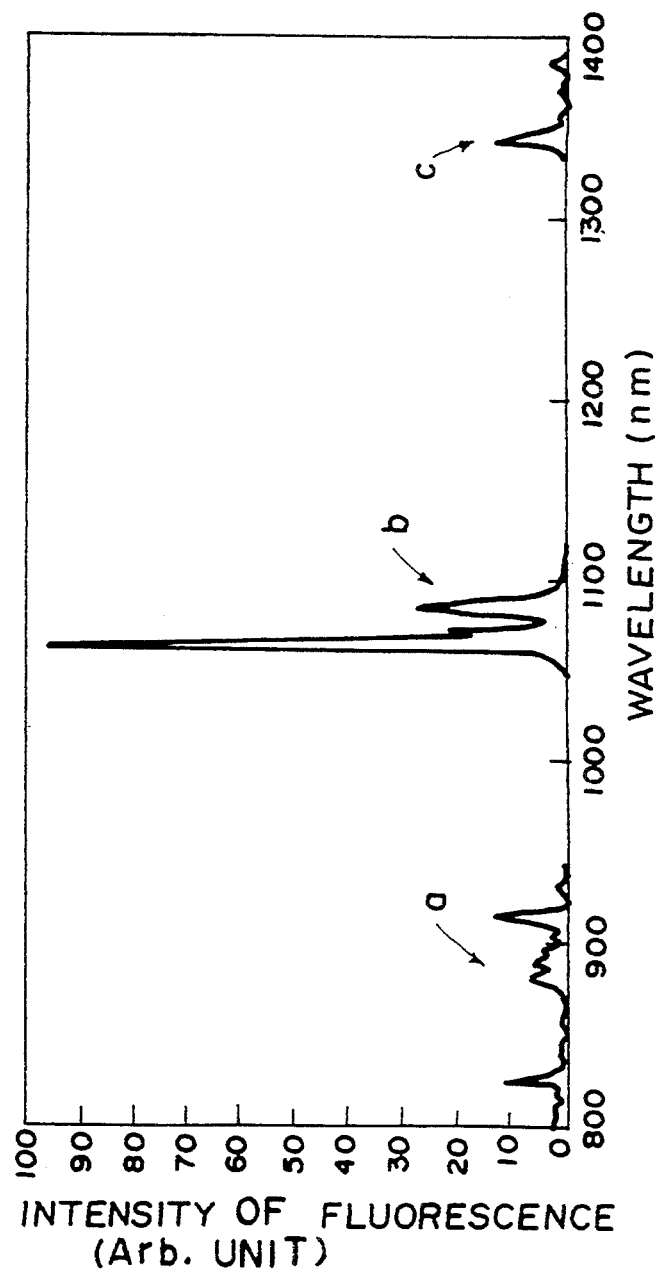
FIG. 4 is a graph showing the fluorescent propera of Nd:GdVO$_4$.
Figure 5:
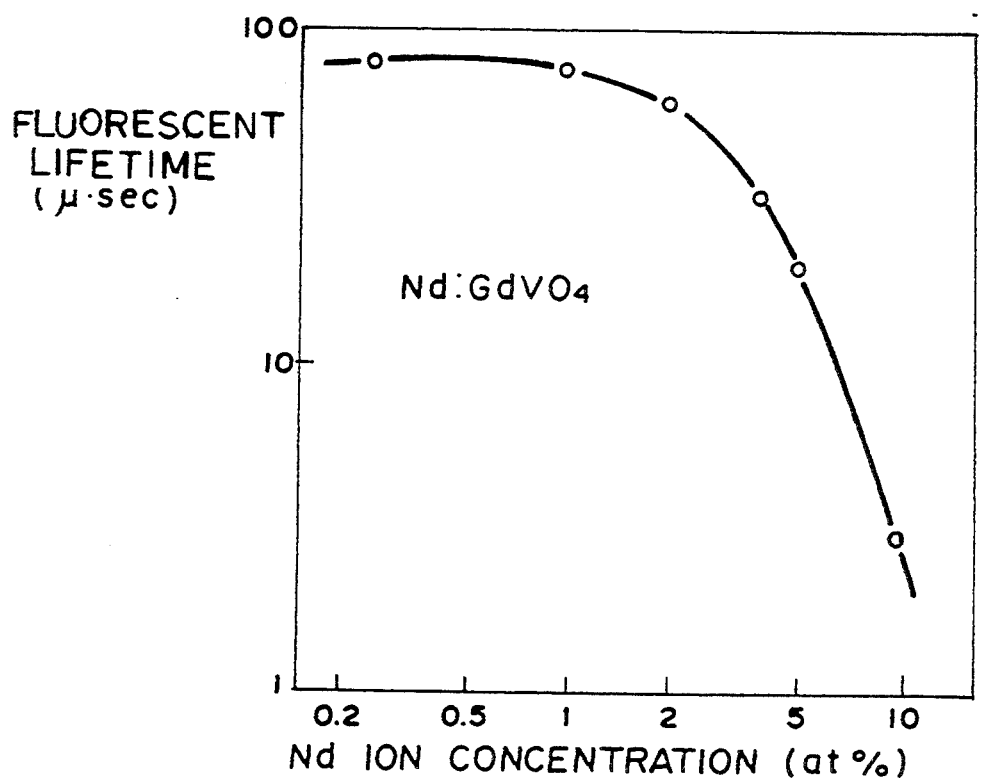
FIG. 5 is a graph showing the relation between the Nd ion concentration and the fluorescent lifetime of Nd:GdVO$_4$.

FIG. 2 shows a solid state laser in accordance with a second embodiment of the present invention. In FIG. 2, the elements analogous to those shown in FIG. 1 are given the same reference numerals and will not be described here. The second embodiment differs from the first embodiment in that a nonlinear optical material 20 is disposed inside the resonator. In this embodiment, the nonlinear optical material 20 is in the form of a KNbO$_3$ crystal.

In the second embodiment, a 1063 nm laser beam 16 enters the nonlinear optical material 20 and is converted into second harmonic wave 21 having a wavelength of 532 nm.

In this embodiment, the coating properties for wavelengths of 808 nm, 1063 nm and 532 nm of the faces 14a and 14b of the Nd:GdVO$_4$ crystal 14, the faces 20a and 20b of the nonlinear optical material 20 and the mirror surface 15a of the resonator mirror 15 are as shown in the following table. The second harmonic wave 21 is obtained through the resonator mirror 15.

|  | 808 nm | 1063 nm | 532 nm |
| --- | --- | --- | --- |
| face 14a | AR | HR | — |
| face 14b | — | AR | HR |
| face 20a | — | AR | AR |
| face 20b | — | AR | AR |
| mirror surface 15a | — | HR | AR |

Also in this embodiment, the second harmonic wave 21 obtained through the resonator mirror 15 proved to be very stable.

When a nonlinear optical material is disposed inside the resonator of the solid state laser in accordance with the present invention, the nonlinear optical material may be of material other than KNbO$_3$ and may be, for instance, of KT:OPO$_4$, $\beta$-BaB$_2$O$_4$ or the like.

Further, in the first and second embodiments described above, Nd:GdVO$_4$ crystal is used as the laser medium, other crystals represented by Nd:Y$_x$Gd$_{1-x}$VO$_4$ ($0 \leq X \leq 0.5$) or Nd:La$_x$Gd$_{1-x}$VO$_4$ ($0 \leq X \leq 0.1$) may be used as the laser medium.

What is claimed;

1. A solid state laser crystal comprising Y$_x$Gd$_{1-x}$VO$_4$ doped with Nd wherein x ranges from $0 \leq X \leq 0.5$.

2. A solid state laser as defined in claim 1 in which the Nd ion concentration is in a range of 0.2 to 10 at %.

3. A solid state laser as defined in claim 1 in which the Nd ion concentration is in a range of 1 to 5 at %.

4. A solid state laser as defined in any one of claims 1 to 3 in which said laser medium is pumped with a laser diode whose oscillation wavelength is in a range of 730 nm to 850 nm.

5. A solid state laser as defined in claim 4 in which a nonlinear optical material for converting the wavelength of a solid state laser beam is provided in a resonator.

6. A solid state laser crystal comprising La$_x$Gd$_{1-x}$VO$_4$ doped with Nd where x ranges from $0 \leq X \leq 0.1$.

7. A solid state laser as defined in claim 6 in which the Nd ion concentration is in a range of 0.2 to 10 at %.

8. A solid state laser as defined in claim 6 in which the Nd ion concentration is in a range of 1 to 5 at %.

9. A solid state laser as defined in any one of claims 6 to 8 in which said laser medium is pumped with a laser diode whose oscillation wavelength is in a range of 730 nm to 850 nm.

10. A solid state laser as defined in claim 9 in which a nonlinear optical material for converting the wavelength of a solid state laser beam is provided in a resonator.

* * * * *